United States Patent [19]

Woodward et al.

[11] Patent Number: 4,970,795
[45] Date of Patent: Nov. 20, 1990

[54] SURVEYOR'S MARKER

[76] Inventors: Thomas F. Woodward, 3690 Main St., No. 11, Mineral Ridge, Ohio 44440; James M. Kleese, 911 Cynthia Ave., Niles, Ohio 44446

[21] Appl. No.: 333,363

[22] Filed: Apr. 4, 1989

[51] Int. Cl.⁵ ............................................. G01C 15/02
[52] U.S. Cl. .......................................... 33/293; 52/103
[58] Field of Search ........................... 116/209; 33/293; 52/153, 103; 135/118; 411/439, 473, 480

[56] References Cited

U.S. PATENT DOCUMENTS

| D. 3,713 | 10/1869 | Bassett . | |
|---|---|---|---|
| D. 3,790 | 12/1869 | Bassett . | |
| D. 46,669 | 11/1914 | Gorsuch . | |
| D. 175,680 | 9/1955 | Glasgow . | |
| D. 260,974 | 9/1981 | Lesser . | |
| 1,902,875 | 3/1933 | Mason | 52/103 |
| 2,154,966 | 4/1939 | Vanderveer | 52/103 |
| 2,773,470 | 12/1956 | Alger . | |
| 3,754,360 | 8/1973 | Herr | 52/103 |
| 3,851,484 | 12/1974 | Steding . | |
| 4,185,424 | 1/1980 | Streit | 52/103 X |
| 4,433,490 | 2/1984 | Black . | |
| 4,738,060 | 4/1988 | Marthaler | 52/103 |

FOREIGN PATENT DOCUMENTS 747656  4/1933  France ................................. 411/439

Primary Examiner—Harry N. Haroian
Attorney, Agent, or Firm—Browdy and Neimark

[57] ABSTRACT

A surveyor's marker includes an elongated body portion tapered in an axial direction from a head portion to a generally pointed tip. The head portion has a cruxiform configuration enabling it to be used in a crosshair's sense and seen at a substantial distance. The device is integrally molded such as by injection molding from a brightly colored and relatively stiff and inexpensive plastic.

11 Claims, 1 Drawing Sheet

SURVEYOR'S MARKER

FIELD OF INVENTION

The present invention relates to the construction industry and, more particularly, to improving the ease and reducing the costs of casting concrete footers during construction and other construction operations.

BACKGROUND OF THE INVENTION

During the early stages of construction, it is often necessary to cast concrete footers for foundations. The first step is to dig an earthen trench or ditch into which the concrete footer will be cast. The height of the concrete casting is then determined by the use of the surveyor's scope or the more modern laser method. In any event, that position must then be marked so that the workers will cast the concrete to the correct height. Marking is effected by the use of physical markers placed at short intervals, normally three to five feet, along the length of the entire ditch.

Insofar as is known, all currently used markers for marking the grade of the concrete to be cast are relatively costly and require substantial physical work and manhours to use. By far the most commonly used technique is for the workman to merely drive a wooden stake or iron rod, normally pounded with a sledge hammer, vertically into the center of the ditch. This is done to a selected depth in conjunction with the surveyor so that the top of the stake ill be at precisely the upper level of the footer or foundation to be cast. The concrete is then poured to the top of the stake or rod and the proper level is obtained.

A lesser known method is sometimes known as the nail and ribbon technique. The workers carry with them sixteen penny nails and plastic ribbon. Each nail is stuck through a short length of plastic ribbon folded into a square. The nail is then inserted horizontally into the side of the ditch at the level instructed by the surveyor. The cement is then poured to the center of the nail head, the ribbon being used to make the nail head more visible against the dirt. One reason this technique is not as widely used as the aforementioned vertical stake method is that the nail does not as accurately show the upper level to which the concrete is to be cast, i.e. the nail head having a rather large diameter does not give an accurate horizontal level, and especially from the seat of the concrete casting device it is not readily apparent from the ribbon on the nail exactly where the upper level of the concrete should be. Other disadvantages of this system are that sixteen penny nails are quite heavy and the workman do not like to carry a large quantity of them; the plastic ribbons have to be cut which causes delays; and the large sixteen penny nails are relatively expensive.

The problems outlined above, which incidentally exist in other construction environments as well such as the laying of sewer lines, the construction of leech beds for the installation of septic tanks, etc., have so far not been solved and present an ongoing problem in various construction environments.

SUMMARY OF THE INVENTION

It is therefore an object of the present invention to overcome deficiencies in the prior art, such as indicated above.

It is another object of the present invention to increase the speed and efficiency and reduce the costs in certain construction activities, such as indicated above, and especially in the casting of concrete footers for foundations.

It is a further object of the invention to provide a surveyor's marker which will accomplish the above objectives.

It is still another object of the present invention to provide a one-piece surveyor's marker made of a lightweight moldable and brightly colored or fluorescent material so that such marker can be readily seen against the dirt background.

It is still a further object of the present invention to provide a surveyor's marker which will save the contractor time and money and will simplify the aforementioned operations.

It is yet another object of the present invention to provide a surveyor's marker which is economical to make and distribute.

It is yet a further object of the present invention to provide a surveyor's marker having a relatively large head having a cross hair configuration which can be readily seen at a substantial distance and which provides cross hair accuracy in the casting of concrete and other operations where it is necessary to define a precise level.

The above and other objects of the invention are achieved by the provision of a unitary surveyor's marker made of an inexpensive light weight moldable material such as plastic which can be readily seen and which preferably has a cross hair head. Such a marker desirably has an elongated body portion extending in an axial direction, the body portion being at least partly tapered so that its end is relatively pointed for placement in the dirt, and a head portion extending substantially perpendicularly to the body portion at the end opposite the pointed end, the head portion having at least one outwardly extending arm and preferably four arms defining a cruxiform configuration.

The above and other objects and the nature and advantages of the present invention will be more apparent from the following detailed description of certain embodiments thereof, reference being made to the accompanying drawing wherein:

DETAILED DESCRIPTION OF EMBODIMENTS

Figure 1:
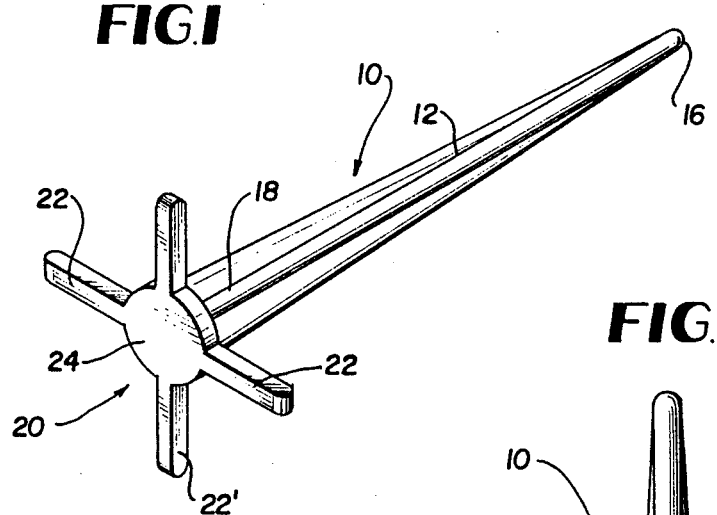
FIG. 1 is a perspective view of a surveyor's marker according to the present invention.
Figure 2:
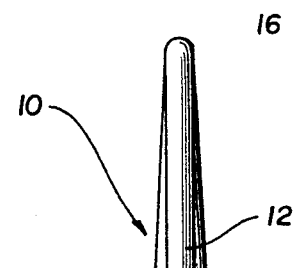
FIG. 2 is a side view of the surveyor's marker of FIG. 1.
Figure 3:
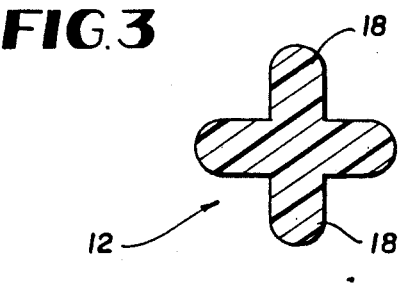
FIG. 3 is an enlarged section taken along line 3—3 of FIG. 2.
Figure 4:
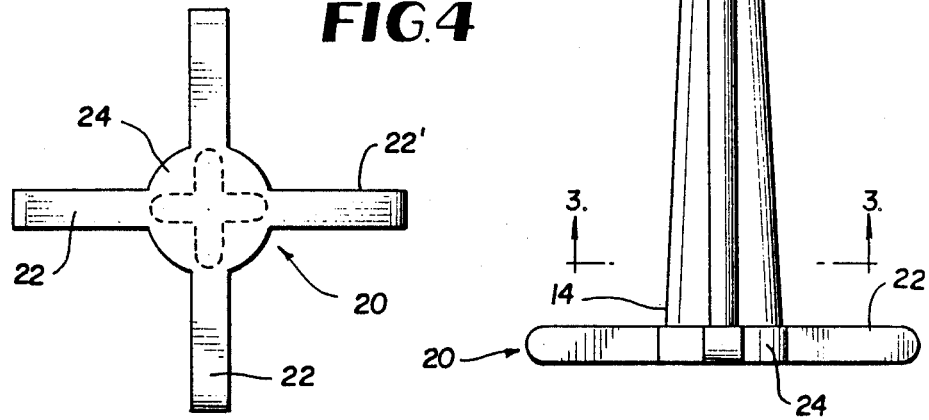
FIG. 4 is an end view of the marker of FIGS. 1-3.

FIG. 1 shows a surveyor's marker 10 according to the present invention including an elongated body portion 12 extending in an axial direction and having a proximal end 14 at approximately the location where the section 3—3 is taken, and distal end 16. The elongated body portion 12 is preferably tapered along its entire length so as to ease its introduction into the dirt, although it will be understood that it is adequate to taper it only near its distal end 16 so as to make such distal 16 relatively pointed in comparison with its proximal end 14. However, and as clearly seen in the illustrated embodiment, the distal end 16 need not come to a sharp point. Also to facilitate insertion of the elongated body portion 12 into the ground and at the same time reduce its bulk and weight, such body portion 12 is preferably formed of an internal core portion from which extend radially a plurality, preferably four, ribs 18 which gradually taper in height from a maximum at the proximal end 14 to a minimum at or near the distal end 16. The ribs 18 also ensure that after placement of the marker into the ground, such marker 10 cannot be easily twisted or rotated about its axis out of alignment.

Provided at the proximal end 14 of the elongated body portion 12 is a head portion 20 having at least one straight arm 22, i.e. one having at least one straight edge surface 22', extending substantially perpendicular to the body portion 12, the arm 22 being of a length substantially greater than the distance across the body portion 12, i.e. its thickness or diameter, at its proximal end 14. Preferably, there are at least two arms 22 spaced opposite from one another, and most preferably there are four arms as illustrated, these four arms 22 defining a cruxiform configuration as illustrated. The length of the arms is an important factor, because these one or more arms 22 must be sufficiently long so as to be able to be seen from a substantial distance, especially by a worker who may be casting concrete from a large piece of equipment at some substantial distance away.

In practice, if there is only one arm 22 it should be at least about an inch long, and if there are two oppositely facing arms i.e. two arms spaced 180° from one another, their ends should be spaced at least about one inch apart. In a preferred embodiment, there are four arms each spaced 90° from its two adjacent arms as shown, the opposite ends of each pair being spaced between 1.3 and 1.5 inches. Additional advantages in the provision of four arms 22 are that one pair of arms can be easily set horizontally by the alignment of the other pair vertically through the use of a plumb bob, and also if one arm becomes broken off or distorted the entire marker 10 need not be discarded if plural arms 22 are present.

In the illustrated embodiment, the head portion 20 has a central circular area 24 from which the arms 22 extend outwardly. The head portion 20 including the central area 24 desirably has a generally planar upper surface for ease of mold design and for greater light reflectivity and consequently improved visibility, although embossing or debossing may be provided in such upper surface if desired.

A marker 10 in accordance with the present invention may be easily and inexpensively molded such as by injection molding from a relatively stiff and inexpensive plastic, such as unplasticized or slightly plasticized PVC, polystyrene or a polyolefin such as polyethylene or polypropylene. While more expensive plastics can be used, there is no advantage in doing so as the markers 10 of the present invention are intended to be used only once. Regardless of what plastic is used, such plastic should contain a coloring additive, such as a pigment or dye, which renders the product very bright and visible. Preferably the plastic also contains a fluorescent or phosphorescent material for enhanced visibility.

In a preferred embodiment having the configuration illustrated in FIGS. 1–4, the elongated body portion 12 is three inches long, the ribs 18 taper at an angle of 2°, the ribs 18 and the head 20 are each 0.093 inches thick, the central area 24 of the head portion 20 has a diameter of 0.38 inches, and the distance between opposite ends of opposite arms 22 is 1.38 inches, each arm having a width of 0.093 inches.

Bearing in mind that, as pointed out above, if there is only one arm 22 it should be at least about an inch long and that the elongated body portion 12 is desirably three inches long, it follows that the length of an arm is desirably no less than about one-third the length of the body portion 12.

For the aforementioned uses, e.g. the casting of concrete footers, the marker 10 according to the present invention is used in the same way as the old nail and ribbon technique. It can also be used to set the level of other construction materials such as gravel forming a support for downwardly sloping perforated pipe in the construction of a septic tank leech bed. It can also be used in marking property boundaries and in laying out buildings, as well as in marking the banks of a lake or pond to record water levels.

As noted above, the present invention provides numerous advantages. It is economical to make, distribute and use, and therefore it reduces construction costs; it is of light weight and easily carried in bulk. The cross-hair concept makes the marker easily seen from a considerable distance, and it provides cross hair accuracy thereby improving construction.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A surveyor's marker comprising
    an elongated body portion extending along an axis and having a proximal end and a distal end, said elongated body member being at least partly tapered so that said distal end is pointed relative to said proximal end; and
    a head portion at said proximal end having a central area and at least three arms each extending outwardly from said central area substantially perpendicular to said axis of said body portion, each of said arms being of a length substantially greater than the distance across said body portion at its proximal end, two of said arms being oppositely disposed from on another at an angle of approximately 180° and a third of said arms being disposed from said two oppositely disposed arms at an angle of approximately 90°, and wherein said two oppositely disposed arms extend a distance no less than about one-third of the length of said body portion; said body portion and said head portion being unitary and integral and formed of plastic having a bright color.

2. A marker according to claim 1 wherein said central area of said head portion is circular and has four arms extending outwardly therefrom to define a cruciform configuration.

3. A marker according to claim 1 wherein said two oppositely disposed arms have ends which are spaced from each other by at least about one inch.

4. A marker according to claim 1 wherein said head portion comprises at least four outwardly extending arms of substantially equal length defining a cruxiform configuration.

5. A marker according to claim 1 wherein said plastic contains a fluorescent or phosphorescent material to provide said bright color.

6. A marker according to claim 1 wherein said plastic is PVC, polystyrene, or a polyolefin.

7. A marker according to claim 1 which is injection molded.

8. A marker according to claim 1 wherein said head portion has a generally planar upper surface.

9. A marker according to claim 1 wherein said body portion is tapered along its entire length.

10. A marker according to claim 1 wherein said body portion comprises a series of radially projecting ribs which taper to said distal end.

11. A surveyor's marker comprising:

an elongated body portion extending along an axis and having a proximal end and a distal end, said elongated body portion having a series of ribs extending radially outwardly therefrom and tapering so that said distal end is pointed relative to said proximal end and said ribs at said proximal end have a maximum radial length; and a head portion at said proximal end having a central area and arm means for defining a horizontal line when said marker is driven horizontally into a sidewall of an earthen ditch, said arm means having a straight edge surface extending outwardly from said central area substantially perpendicular to said axis of said body portion, said arm means comprising at least one arm of a length substantially greater than the distance across said body portion at its proximal end and including the radial length of said ribs;

said body portion and said head portion being unitary and integral and formed of plastic having a bright color.

* * * * *